United States Patent [19]

Goel

[11] Patent Number: 4,695,605

[45] Date of Patent: Sep. 22, 1987

[54] SAG RESISTANT, HIGH PERFORMANCE EPOXY STRUCTURAL ADHESIVES

[75] Inventor: Anil B. Goel, Worthington, Ohio

[73] Assignee: Ashland Oil, Inc., Ashland, Ky.

[21] Appl. No.: 913,903

[22] Filed: Oct. 1, 1986

[51] Int. Cl.[4] ............................................ C08G 18/30
[52] U.S. Cl. .................................... 525/109; 525/111;
525/123; 528/61; 528/64; 528/73; 528/104;
528/111; 528/119; 528/123; 528/124
[58] Field of Search ....................... 525/109, 111, 123;
528/61, 64, 73, 104, 111, 119, 123, 124

[56] References Cited

U.S. PATENT DOCUMENTS 3,853,812 12/1974 Helm .................................... 528/124
4,578,424 3/1986 Goel ...................................... 528/73

Primary Examiner—Maurice J. Welsh
Assistant Examiner—S. A. Acquah
Attorney, Agent, or Firm—John F. Jones

[57] ABSTRACT

A structural adhesive which is particularly useful in vertical substrates is composed of a mixture of two components, the first component being an epoxy resin component comprising a poly epoxide and a polyisocyanate which has been allowed to react with less than an equivalent weight of a polyamine which is a primary or secondary polyamine and the second component being a hardener for the polyepoxide comprising a mixture of primary, secondary and tertiary amines, amido amines and phenolics.

12 Claims, No Drawings

SAG RESISTANT, HIGH PERFORMANCE EPOXY STRUCTURAL ADHESIVES

The present invention relates to high performance epoxy resin structural adhesives and to a method for their preparation and more particularly pertains to Epoxy resin structural adhesives which are composed of two components, one component being a mixture of a polyepoxide and a small amount of polyisocyanate which has been allowed to react with a small amount of primary or secondary polyamine and the second component being an epoxy resin hardener. The structural adhesive is formed by mixing the two components just prior to its application to a substrate.

It is known that sag-resistance is an important and highly desired property in adhesive compositions particularly those adhesive compositions which are used in applications in which the adhesive is to be applied to vertical surfaces. Many two component epoxy adhesives having some non-sagging behavior are known in the prior art and are commercially available. The sag resistance in the prior art adhesive compositions has usually been achieved by using known thixotropic fillers in the adhesive components. Such thixotropic fillers include fumed silica and other similar materials. Although use of fumed silica for improved thixotropy does provide some non-sagging character, its presence in appreciable amounts in the adhesive also increases the dilatency of the components which makes the processing/dispensing/application of the adhesive difficult.

U.S. Pat. No. 4,578,424 describes the use of polyisocyanate monomers in the epoxy component of a two component epoxy resin adhesive. When the epoxy component is mixed with the hardener component in such a system, thixotropy builds up in the resulting adhesive. Although the adhesives described in U.S. Pat. No. 4,578,424 are very satisfactory from all standpoints, they do have a tendency to lose their non-sag character on long standing in the presence of atmospheric moisture, probably because of slow hydrolysis of the polyisocyanate. Such loss of thixotropy over the period of several days to months is particularly noticeable in the case of highly reactive isocyanates. The present invention represents an improvement over that described in U.S. Pat. No. 4,578,424 in that the former provides more consistent and stable non-sagging adhesive compositions.

The present invention relates to the use of polyisocyanates in the epoxy resin component which polyisocyanates are either completely or partially prereacted with poly primary or secondary amines. The epoxy resin component of the present invention may also be modified by the presence of a carboxylic acid containing rubber material, such as a carboxylic acid terminated butadiene/acrylonitrile rubber which imparts improved flexibility and toughness to the final adhesive composition. Also in the present invention the thixotropic property in the epoxy component is built up chemically by mixing the epoxy resin with small amounts (about 1 to 10% by weight) of a polyisocyanate and reacting this isocyanate either partially or completely with a poly amine and preferably a di- or tri-primary or secondary amine such as ethylene diamine. The di- or tri-primary or secondary amines useful in this invention include both aliphatic and aromatic amines such as ethylene diamine, propylene diamine, butylene diamine, piperazine, poly(alkylene oxide) di- or tri-primary amines, diethyl toluene diamine and the like. The amount of amine used for reaction with the polyisocyanate for thixotropic build up is one or less than one equivalent of amine per equivalent of isocyanate present in the polyisocyanate. It is important to use no more than one equivalent and preferably at least slightly less than one equivalent of amine per equivalent of isocyanate in order to insure consumption of all of the amine by reaction with the polyisocyanate. Any excess amine present in the epoxy component would cause curing of the epoxy resin which in turn would give premature gelling of the epoxy resin component. The epoxy resin component may also be filled with fillers such as talc, kaolin, aluminum oxide, particulate metals and metal oxides, fumed silica and the like and additions of conventional materials used in adhesive technology such as plasticizers, pigments, colorants, etc. may also be used with the scope of this invention.

The hardener component useful in this invention comprises mixtures of primary, secondary and tertiary amines, amido amines, and phenolics such as Bisphenol-A. In order to impart flexibility to the final adhesive, long chain poly(alkylene oxide) di- or tri-primary amines (molecular weight ranging from about 2100 to about 10,000) and amine terminated polybutadiene/acrylonitrile rubber may be used. Amine cure accelerators known in the art including boron trifluoride-amine complexes, tris(dimethyl amino methyl) phenol thiols and the like may be used. The hardener component may be filled with fillers such as talc, kaoline, aluminum oxide, metal powders and metal oxides, fumed silica and the like as in the case of the epoxy resin component described above.

Although the thixotropy in the epoxy resin component is adequate enough to provide the non-sag behavior in the mixed epoxy adhesive, if desired, similar chemical thixotropy can be built up in the hardener component simply by reacting with a small amount of polyisocyanate. The amount of isocyanate should be in the range of from 0 to 10% by weight of the amine hardener component.

Although this invention is primarily directed to two component epoxy resin adhesives, the technology is equally applicable to single component epoxy resin adhesives.

The epoxy resins or polyepoxides useful in this invention can be monomeric of polymeric, saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

Typical polyepoxides suitable in the practice of this invention include those disclosed in U.S. Pat. Nos. 2,500,600 and 2,324, 483 which are incorporated herein by reference. Preferred in this invention are 1,2-epoxy compounds having an epoxide equivalence greater than 1, that is to say, compounds containing more than one group of the formula:

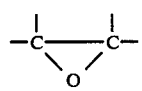

The 1,2-epoxide groups may be either terminal or inner ones. Particularly suitable terminal 1,2-epoxide groups are 1,2-epoxy ethyl or 1,2-epoxy propyl groups.

The latter may be linked to an oxygen atom, that is to say, they are glycidyl ether or glycidyl ester groups. Compounds with inner epoxide groups usually contain the 1,2-epoxyde group in al aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic five-membered or six-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisicyanate, 2,3-dimethyl tetramethylene diisocyanate, butylene-1,2-diisocyanate, butylene-1,3-diisocyanate, 1,4-diisocyanate cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisicyanate, benzene-1,2,4-triisocyanate, xylene-1,4-diisocyanate, sylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

Some of the key desired features of two component epoxy resin structural adhesives include:

Component (or components) having low dilatency and adequate processible viscosity.

Non-critical mix ratio (ratio tolerance when mixing the epoxy resin component and the hardener component).

Non-sagging character of the mixed adhesive.

Reasonably long ambient temperature open time for the mixed adhesive material (generally at least about 30 minutes).

Rapid handling strength for the adhered substrates (50 psi) build up at moderately elevated temperature (about 100° C.)

No need for rigorous surface preparation of substrates (cleaning, scratching, scrubbing, priming, etc.).

High flexibility and tough adhesive bond with high shear and peel strengths at room temperature to about 180° F.

Low hygroscopicity of the adhesive mixture.

High heat resistance of adhesive bond (about 400° F. at least one hour).

The adhesive compositions of the present invention fulfill all of the aforementioned desired features for structural adhesives.

This invention is further illustrated in the following representative examples.

EXAMPLE 1

The following general procedure for the preparation of adhesive bonds was used throughout the following examples. The two components, i.e., the epoxy resin component and the hardener component, were mixed in appropriate weight amounts at room temperature. The resulting mixed thixotropic adhesive was applied in the form of ⅜ inch beads across the surface of the substrate (sheet molding compound or SMC laminates made of glass fiber reinforced thermoset polyester) which were in the form of sheets measuring 12 inches by 4 inches by 100 mils (thickness) after the surface of the substrate sheet had been dry wiped with a clean cloth. After sprinkling a few 30 mils diameter glass beads on the top of the adhesive to obtain a final glue line thickness of 30 mils, the other sheet was placed on the top of the first with a one inch overlap between sheets. The resulting samples were cured in a heated fixture at 230° F. under pressure of 1 psi for 3–4 minutes and were then placed in an over at 285° F. for post curing for 30 minutes. Test specimens were cut from these cured samples into one-inch strips. In this manner, several lap shear and side impact test samples were prepared for each adhesive tested.

The lap shear tests were performed on the samples as follows:

A. Shear strength test determined at room temperature.

B. Postbaking the sample at 400° F. for an additional one hour and then test shear strength at room temperature.

C. Shear strength test run at 180° F.

EXAMPLE 2

A hardener component was prepared by blending 33 parts by weight of poly(propylene oxide) triprimary amine prepared from poly(propylene oxide) and ammonia (molecular weight of about 3100 obtained from Texaco Chemical Co., 9 parts by weight of poly(propylene oxide) diprimary amine (molecular weight of about 400 obtained from Texaco chemical Co., 12.6 parts by weight of Bisphenol-A, 8.4 parts by weight of tris(dimethyl aminomethyl) phenol, 2 parts by weight of aminoethyl piperazine and 35 parts of talc. The mixture as degassed under reduced pressure to give a hardener component designated as H1. A part of this hardener H1 was mixed rapidly with 2% by weight of liquid methylene bis(phenyl isocyanate) and this hardener component was designated H2.

EXAMPLE 3

An epoxy resin component was prepared by reacting 66 parts by weight of a liquid diglylcidyl ether of Bisphenol-A (epoxy equivalent weight of about 188) with 8 parts by weight of carboxylic acid terminated polybutadiene/acrylonitrile (18% by weight of acrylonitrile in the polymer), Hycar rubber from B.F. Goodrich, and blending this with 24.5 parts by weight of talc and 1.5 parts of fumed silica. This mixture was degassed under reduced pressure and designated E1.

A part (35.5g) of E1 was mixed with 1.6 g of liquid methylene bix (phenyl isocyanate) and reacted under high shear with 0.3 g of ethylene diamine. A trixotropic, pasty material formed which was degassed. This epoxy component was designated E2.

Another part (35.5 g) of E1 was mixed with 1.5 g of liquid methylene bix (phenyl isocyanate) and the liquid was reacted with 1.15 g of poly(propylene oxide) diprimary amine (molecular weight of about 230). The resulting thixotropic material was degassed and designated E3.

A part (71 g) of E1 was mixed with 3.2 g of liquid methylene bix (phenyl isocyanate) and the resulting liquid was reacted with 0.86 g of piperazine. The resulting thixotropic material was degassed and designated E4.

A part (71 g) of E1 was mixed with 1.5 g of liquid methylene bix (phenyl isocyanate) and reacted with 2 g of poly(propylene oxide) diprimary amine (molecular weight of about 400). The resulting thixotropic paste was degassed and designated E5.

A part (35 g) of E1 was mixed with 2 g of isophorone diisocyanate and reacted with 0.4 g of ethylene diamine. The resulting material was degassed and designated E6.

EXAMPLE 4

The epoxy resin component E2 (14 g) and the hardener H1 (10 g) were mixed for 30 seconds to give thixotropic pasty material. This sag resistant adhesive, having room temperature open time of 30 minutes and 230° F. cure time of less than two minutes, was used to make adhesive bonds on fiberglass reinforced polyester (SMC) sheets by following the procedure of Example 1. Similarly, different epoxy resins and hardeners of Example 3 and Example 2 were mixed and tested. The lap shear strength test results which showed 100% substrate delamination in each case are given in the following Table. For comparison purposes, when E1 epoxy component was mixed with H1 hardener component in a similar manner, no non-sag behavior was observed for the resulting adhesive when it was applied to a vertical surface.

TABLE

| Sample No. | Test Procedure | Lap Shear Strength (psi) | | | | |
|---|---|---|---|---|---|---|
| | | E2/H2 | E2/H1 | E3/H1 | E4/H1 | E5/H1 |
| 1 | A | 298 | 350 | 430 | 390 | 410 |
| 2 | A | 430 | 385 | 420 | 450 | 395 |
| 3 | B | 400 | 280 | 350 | 290 | 350 |
| 4 | B | 390 | 310 | 320 | 315 | 310 |
| 5 | B | 375 | 300 | 340 | 310 | 315 |
| 6 | C | 410 | 325 | 395 | 330 | 395 |
| 7 | C | 395 | 350 | 400 | 318 | 390 |

I claim:

1. An adhesive composition comprising a mixture of a first component comprising a polyepoxide and a polyisocyanate said polyisocyanate having been allowed to react with a primary or secondary polyamine and a second component comprising a hardener which is a mixture of primary, secondary, and tertiary amines, amido amines, and phenolics.

2. The composition of claim 1 wherein the polyepoxide is a compound having more than one group of the formula

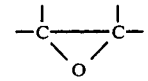

3. The composition of claim 2 wherein there is present from 1 to 10% by weight of the polyisocyanate in the first component.

4. The composition of claim 3 wherein less than one equivalent of poly amine per equivalent of polyisocyanate present in the first component.

5. The composition of claim 4 wherein the first component comprises a diglycidyl ether of Bisphenol-A, the poly amine is ethylene diamine and the polyisocyanate is methylene bis(phenyl isocyanate).

6. The composition of claim 4 wherein the first component comprises a diglycidyl ether of Bisphenol-A, ethylene diamine, a poly(propylene oxide) diprimary amine and methylene bis(phenyl isocyanate).

7. The composition of claim 4 wherein the first component comprises a diglycidyl ether of Bisphenol-A, ethylene diamine and isophorone diisocyanate.

8. The composition of claim 4 wherein the first component comprises a poly(propylene oxide) triprimary amine, a poly(propylene oxide) diprimary amine, tris(dimethyl amino methyl) phenol and aminoethyl piperazine.

9. The composition of claim 4 wherein the first component comprises a poly(propylene oxide) triprimary amine, a poly(propylene oxide) diprimary amine, tris(dimethyl amino methyl) phenol, amino ethyl piperazine and methylene bis(phenyl isocyanate).

10. The composition of claim 5 wherein the first component comprises a poly(propylene oxide) triprimary amine, a poly(propylene oxide) diprimary amine, tris(dimethyl aminomethyl) phenol and aminoethyl piperazine.

11. The composition of claim 6 wherein the first component comprises a poly(propylene oxide) triprimary amine, a poly(propylene oxide) diprimary amine, tris(dimethyl amino methyl) phenol and amino ethyl piperazine.

12. The composition of claim 7 wherein the first component comprises a poly(propylene oxide) triprimary amine, a poly(propylene oxide) diprimary amine, tris(dimethyl amino methyl) phenol and amino ethyl piperazine.

* * * * *